(12) United States Patent
Pujolle et al.

(10) Patent No.: US 9,137,105 B2
(45) Date of Patent: Sep. 15, 2015

(54) METHOD AND SYSTEM FOR DEPLOYING AT LEAST ONE VIRTUAL NETWORK ON THE FLY AND ON DEMAND

(75) Inventors: Guy Pujolle, Chatillon (FR); Omar Cherkaoui, Montreal (CA)

(73) Assignees: Universite Pierre et Marie Curie (Paris 6), Paris (FR); Centre National De La Recherche Scientifique, Paris (FR)

( * ) Notice: Subject to any disclaimer, the term of this patent is extended or adjusted under 35 U.S.C. 154(b) by 0 days.

(21) Appl. No.: 13/382,541

(22) PCT Filed: Jul. 16, 2010

(86) PCT No.: PCT/FR2010/051495
§ 371 (c)(1),
(2), (4) Date: Jan. 6, 2012

(87) PCT Pub. No.: WO2011/007105
PCT Pub. Date: Jan. 20, 2011

(65) Prior Publication Data
US 2012/0131579 A1    May 24, 2012

(30) Foreign Application Priority Data
Jul. 16, 2009 (FR) ...................... 09 54934

(51) Int. Cl.
G06F 9/455 (2006.01)
H04L 12/24 (2006.01)
H04L 12/46 (2006.01)

(52) U.S. Cl.
CPC ........ H04L 41/0806 (2013.01); H04L 12/4641 (2013.01); H04L 41/5054 (2013.01)

(58) Field of Classification Search
CPC .................................................. H04L 41/0806
USPC .............................................................. 718/1
See application file for complete search history.

(56) References Cited

U.S. PATENT DOCUMENTS

| | | | |
|---|---|---|---|
| 5,539,883 A | 7/1996 | Allon et al. | |
| 6,687,220 B1 | 2/2004 | Ayres | |

(Continued)

FOREIGN PATENT DOCUMENTS

| | | | |
|---|---|---|---|
| EP | 1 265 414 A1 | 12/2002 | |
| WO | 0223812 A2 | 3/2002 | |
| WO | 2007021836 A2 | 2/2007 | |

OTHER PUBLICATIONS

John D. Day, Hubert Zimmermann, The OSI Reference Model, 1983, IEEE.*

(Continued)

*Primary Examiner* — Emerson Puente
*Assistant Examiner* — Charlie Sun
(74) *Attorney, Agent, or Firm* — Wood, Herron & Evans, LLP

(57) ABSTRACT

The invention relates to a method for generating, on the fly and on demand, at least one virtual network (402, 404, 406), adapted for a specific use, on a physical network (200), referred to as an infrastructure network, including physical nodes (204, 206, 208, 210), each of said physical nodes (204, 206, 208, 210) runs at least one network operating system, said method including the following steps: determining, on at least one computer device (202), referred to as a virtual network server, data related to said virtual network (402) to be generated in accordance with said particular use; transmitting, on the basis of said data and to at least a portion of said physical nodes (204, 206, 208, 210), referred to as active nodes, of said infrastructure network (200), a request for creating a virtual node; and creating a virtual node on each of said active nodes by installing a virtual device in each of said active nodes, said virtual network consisting of all of said virtual nodes thus created. The invention also relates to a system implementing such a method.

17 Claims, 2 Drawing Sheets

(56) References Cited

U.S. PATENT DOCUMENTS

| | | |
|---|---|---|
| 6,985,937 B1 | 1/2006 | Keshav et al. |
| 7,546,631 B1 | 6/2009 | Moogala et al. |
| 8,544,002 B2 | 9/2013 | Edwards et al. |
| 2003/0135596 A1 | 7/2003 | Moyer et al. |
| 2003/0140132 A1 | 7/2003 | Champagne et al. |
| 2005/0144282 A1 | 6/2005 | Argo |
| 2005/0180429 A1 | 8/2005 | Ghahremani et al. |
| 2006/0155912 A1 | 7/2006 | Singh et al. |
| 2007/0064603 A1 | 3/2007 | Chen et al. |
| 2008/0059556 A1* | 3/2008 | Greenspan et al. ........... 709/201 |
| 2008/0141264 A1 | 6/2008 | Johnson |
| 2008/0184229 A1 | 7/2008 | Rosu et al. |
| 2009/0210869 A1* | 8/2009 | Gebhart et al. ............... 717/174 |
| 2010/0011353 A1* | 1/2010 | Chalupa et al. ............... 717/177 |
| 2010/0153554 A1* | 6/2010 | Anschutz et al. ............. 709/226 |
| 2010/0235482 A1* | 9/2010 | Chalupa et al. ............... 709/222 |
| 2010/0235831 A1* | 9/2010 | Dittmer ............................. 718/1 |

OTHER PUBLICATIONS

Xuxian Jiang, Dongyan Xu, SODA: a Service-On-Demand Architecture for Application Service Hosting Utility Platforms, Proceedings of the 12th IEEE International Symposium on High Performance Distributed Computing (HPDC'03), IEEE, 2003.*

S. Ghernaouti-Hélie et al., Enterprise Networks and Telephony, Springer-Verlag London Limited, 1998, p. 55, 61.*

European Patent Office; Search Report and Written Opinion in International Patent Application No. PCT/FR2010/051495 dated Oct. 4, 2010; 10 pages.

European Patent Office, Search Report and Written Opinion issued in International Patent Application No. PCT/FR2010/051496 dated Oct. 4, 1010, 10 pages.

United States Patent and Trademark Office, non-final Office Action issued in U.S. Appl. No. 13/383,461 mailed Mar. 13, 2014, 12 pages.

* cited by examiner

METHOD AND SYSTEM FOR DEPLOYING AT LEAST ONE VIRTUAL NETWORK ON THE FLY AND ON DEMAND

The present application relates to a method for generating a virtual network on the fly and on demand. It also relates to a system implementing such a method.

The field of the invention is the field of communication networks and more particularly virtual communication networks.

In computer technology, a general definition of virtualization is a set of hardware and/or software techniques allowing several operating systems and/or several applications to operate on a single machine, separately from each other, as if they were operating on physically separate machines.

It is possible in this way to install several virtual networks on one physical network, each of the virtual networks being composed of several virtual nodes installed on physical machines.

Currently, virtual networks are installed manually, by manually installing each of the virtual nodes of a network on a physical device. This requires significant time outlay, on the one hand for installing and configuring each of the virtual nodes and on the other hand for interconnecting each of the virtual nodes.

A purpose of the present invention is to overcome this drawback.

Another purpose of the present invention is to propose a method and a system for deploying one or more virtual networks on the fly and in a totally automated manner.

It is also a purpose of the present invention to propose a method and a system for deploying one or more virtual networks, adapted for particular uses, on the fly and in a totally automated manner.

Finally another purpose of the present invention is to propose a method and a system for deploying one or more virtual networks easily and quickly.

The invention proposes to reach the above-mentioned purposes by a method for generating, on the fly and on demand, at least one virtual network adapted to a particular use on a physical network, called an infrastructure network, comprising physical nodes, each of said physical nodes running at least one network operating system (NOS), said method comprising the following steps:

- determining, on at least one computer device called a virtual network server, data relating to said virtual network to be generated in accordance with said particular use,
- transmitting, in accordance with said data, a request for creating a virtual node to at least one portion of said physical nodes, called active physical nodes, of said infrastructure network; and
- creating a virtual node on each of said active nodes by installing a virtual device in each of said active nodes, said virtual network being composed of said thus-created virtual nodes.

The method according to the invention allows one or more virtual networks to be deployed in a physical network infrastructure, from a physical computer device called a virtual network server, in accordance with the data relating to the virtual network to be deployed.

Advantageously, the method allows virtual networks to be created that are adapted to a particular use or a particular function. For example, the method according to the invention allows a first virtual network to be deployed, adapted to banking operations and requiring a high level of security, and a virtual network adapted to telecommunications operations and requiring a high flow.

Moreover, deploying virtual networks using the method according to the invention is carried out in a fully automated manner and without human intervention.

Further, deploying a virtual network in accordance with the method according to the invention is carried out easily and quickly.

The method according to the invention can moreover comprise a step of configuring each virtual node in accordance with the request for creating a virtual node. It is therefore possible using the method according to the invention to configure one or more nodes of a single virtual network differently. This allows more flexible virtual networks to be created on the fly and on demand.

Transmitting data between the virtual network server and each of the active physical nodes can be carried out over a virtual network using for example internet protocols such as the IP, UDP protocols, etc.

According to a preferred version of the method according to the invention, the method according to the invention can comprise transmitting data for configuring a virtual network device. In this preferred version, each physical device of the infrastructure network contains one or more "blank" unconfigured instances of the virtual device(s) to be installed for creating the virtual devices of the virtual network to be created. A virtual network device instance is configured in accordance with the data received. In this version, no network device software is transmitted. This preferred version of the method according to the invention allows the transmission of network device software to each physical node to be avoided, reducing the volume of the data to be transmitted, and making it possible to deploy the virtual network more rapidly.

In another version of the method according to the invention, the method according to the invention can comprise transmitting virtual device software from at least one computer device to each active node. In a particular embodiment, the computer device in question can be that on which the data relating to the virtual network are determined, i.e. the virtual network server. The virtual device transmitted to each physical node of the infrastructure network can be configured, before transmission, according to need, the nature of the virtual network, and/or the nature of the physical node on which the virtual node is to be created.

According to a particular embodiment, creating a virtual node on a physical node can be carried out by a hypervisor installed on the physical node on which the virtual node is created.

According to a particularly advantageous embodiment, installing the virtual device on a physical node for creating a virtual node can comprise generating a network operating system instance. Generating the operating system can be carried out at the physical node on which the virtual node is created. The operating systems implemented on the different nodes of a single virtual network can be different. Thus, a portion of the virtual nodes can be created using instances of a first operating system, for example of Windows® type, and the other portion using instances of a second operating system, for example of Linux type, and so on.

The data relating to the virtual network to be generated can comprise data relating to at least one first template describing the sites where the virtual devices will be installed.

The data relating to the first template can for example comprise the name of the physical nodes on which the virtual nodes of the virtual network to be generated will be created.

Advantageously, the request for creating a virtual node transmitted by the server to at least one physical node can comprise data relating to at least one second template describing the physical resources to be allocated to said virtual node to be created on said physical node, this being carried out for each of the virtual nodes to be created.

The data relating to the second template can in particular comprise, for each virtual node, data relating to:
  central processor unit,
  storage means,
  at least one network interface,
  at least one MAC address, and/or
  at least one driver and/or bridge necessary for connecting the virtual node to at least one physical link.

Moreover, the request for creating a virtual node transmitted by the server to at least one physical node can comprise data relating to at least one third template describing the virtual network to be generated.

The data relating to the third template can comprise for each virtual node to be created, data relating to:
  the name of the virtual network,
  a type of node, and/or
  an Internet Protocol address, and/or
  establishing a VPN tunnel, an SSH tunnel, or any tunnel necessary for the communication.

Advantageously, the request for creating a virtual node transmitted by the server to at least one physical node can comprise data relating to at least one fourth template relating to the network operating system for the virtual node to be created on said physical node.

This fourth template can comprise, for each virtual node to be created, data relating to:
  the type of network operating system, and/or
  the name of the operating system.

In the present application, the term "template" denotes a data presentation model.

The invention also relates to a virtual network obtained by the method according to the invention.

According to another aspect of the invention, a system is proposed for generating, on the fly and on demand, at least one virtual network adapted to a particular use on a physical network, called an infrastructure network, comprising physical nodes, each of said physical nodes running at least one network operating system (NOS), said system comprising:
  a computer device, called a virtual network server, for generating data relating to said virtual network to be generated,
  means of transmitting a request for creating a virtual node to at least one portion of said physical nodes, called active physical nodes, of said infrastructure network;
  means of creating a virtual node on each of said active physical nodes by installing a virtual device in each of said active physical nodes, said virtual network being composed of the set of said thus-created virtual nodes.

Advantageously, the means of creating a virtual node can comprise a computer program, called a hypervisor, run on each physical node and carrying out the installation of the virtual computer device in accordance with the request for creating a virtual node received from the virtual network server.

The virtual computer device can be chosen from the following virtual computer devices:
  a virtual router,
  a virtual switch,
  a switch router or label-switched router (LSR),
  a firewall
  a virtual box (middle box, home gateway, etc.)

Other advantages and characteristics of the invention will become apparent on examination of the detailed description of an embodiment which is no way limitative, and the attached drawings in which.

In the figures, elements common to several figures are given the same reference.

Figure 1:
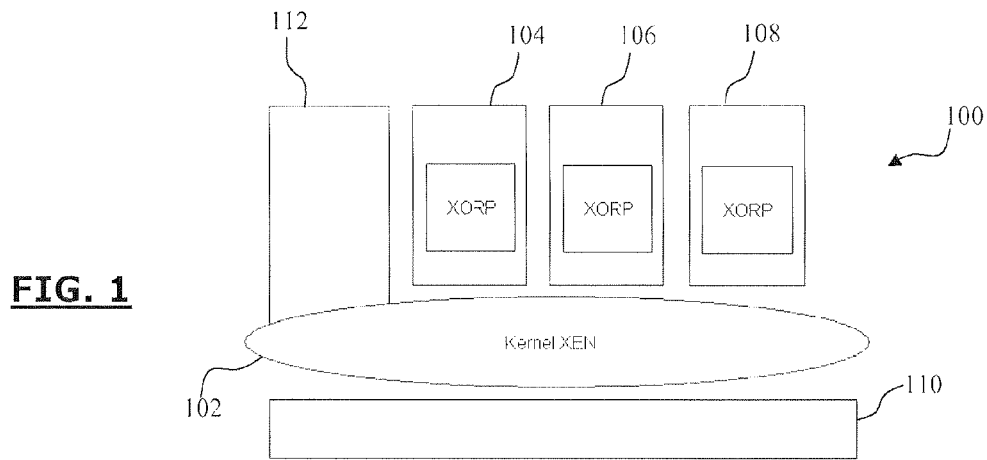
FIG. 1 is a diagrammatic representation of a physical node architecture on which several virtual nodes are installed.

FIG. 1 is a diagrammatic representation of the virtualization architecture on a physical node of a physical network allowing several virtual nodes to be installed on a physical node.

The physical node 100, shown in FIG. 1, contains virtualization software 102, called a hypervisor, which in the present example is XEN software operating directly on the hardware of the physical node 100. XEN software, like any hypervisor software, allows several network operating system (NOS) to be run on the physical node 100, each of these operating systems constituting a virtual node.

In the example shown in FIG. 1, three virtual nodes 104, 106, 108 are installed on the physical node 100. Each operating system comprises XEN drivers allowing interfacing with the XEN 102 hypervisor software.

The network operating system (NOS) supporting the virtual nodes 104-108 can be identical or different for example, Windows, Linux, NetBSD, FreeBSD or other operating systems.

In the present example, the virtual routers 104-108 are XORP router platforms (Extensible Open Router Platform).

The physical node comprises moreover physical peripherals 110 as well as control software and drivers 112.

Figure 2:
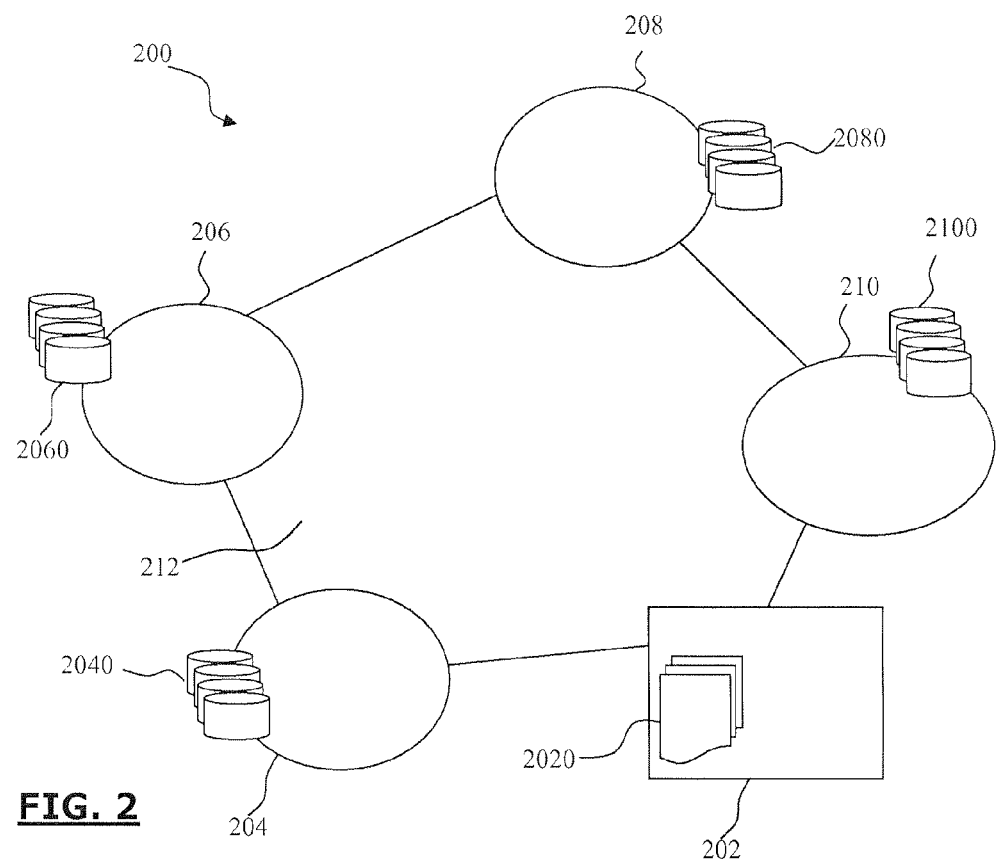
FIG. 2 is a diagrammatic representation of an infrastructure network comprising four physical nodes and a virtual network server.

FIG. 2 is a diagrammatic representation of a infrastructure network 200 comprising a physical computer device 202, called a virtual network server, four physical nodes 204 to 210, linked together by a particular virtual network in the role of a signalling network 212.

In the example shown in FIG. 2, the physical nodes 204 to 210 are physical nodes such as the physical node 100 shown in FIG. 1.

The creation of several virtual networks in a totally automated manner, on demand and on the fly, will now be described with reference to FIGS. 2-4. In the interests of clarity, it will be assumed that the virtual network to be created comprises virtual routers only.

Each physical node is therefore arranged so that that several virtual routers can be installed thereon. To this end, each of the physical nodes 204 to 210 contains a "holding tank" of virtual computer devices, more precisely a holding tank of unconfigured virtual nodes, namely holding tanks 2040, 2060, 2080 and 2100. These holding tanks include instances of one or more computer devices ready to be configured in accordance with of one or more particular uses, namely banking operations, telecommunications operations, or other.

Each holding tank comprises as many virtual routers as necessary with the network operating systems associated with the protocol stacks corresponding to their various applications with higher or lower security, higher or lower quality of service, more or less mobility management, etc.

A network operating system supporting a specific protocol stack and therefore a specific virtual router instance available in each of the physical nodes 204 to 210 corresponds to each particular client or enterprise and to an application.

Constituting the different holding tanks of virtual routers 2040, 2060, 2080 and 2100 can be carried out as follows. The different unconfigured virtual routers with their net work operating system associated with the protocol stacks corresponding to their various applications can be input in advance into the virtual network server 202. The server 202, shown centralized in FIG. 2 but which can also be distributed, transfers the virtual routers with their inactive network operating system to the different nodes of the physical network in order to constitute the holding tanks of virtual routers 2040, 2060, 2080 and 2100 without the protocol stacks associated with their various applications.

The protocol stacks associated with the various applications are stored in a holding tank 2020 of protocol stacks at the virtual network server 202. The transfer of the virtual routers from the virtual network server 202 to the different physical nodes 204 to 210 takes place using the signalling network 212 capable of interacting with the hypervisors of the different physical nodes 204 to 210.

Figure 3:
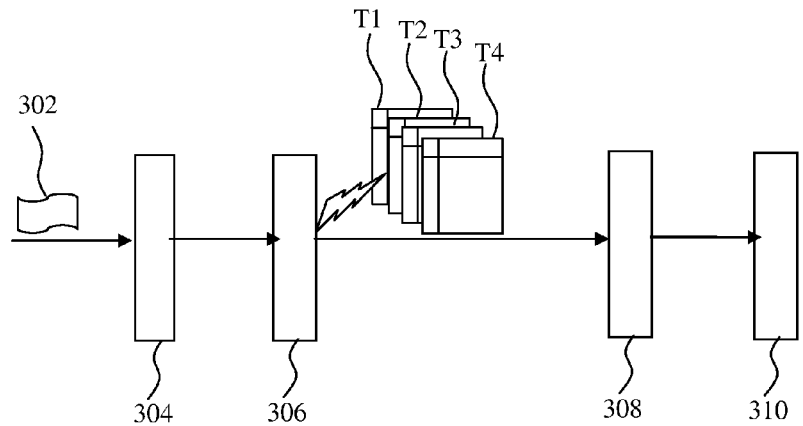
FIG. 3 is a diagrammatic representation of the steps of an example of creating a virtual network on the fly and on demand in accordance with the method according to the invention.

With reference to FIG. 3, when a user or an enterprise sends a request 302 to the virtual network server 202, via the signalling network 212, asking it to install a virtual network on the fly in order to allow him to transmit the data associated with a specific service, the following steps are automatically carried out.

During a step 304 of generating data relating to the virtual network to be created: the virtual network server chooses the virtual router corresponding to the specific service, the physical routers where the virtual routers will be installed in the infrastructure network 200 and the physical resources to be allocated to this virtual network, and generates the data relating to these choices.

The algorithm for choosing the virtual router, the physical routers for their installation and the physical resources can, for example, be the following: the virtual network server determines the choice of the virtual router using the information given by the user for creating the virtual network, such as the type of service to be provided, the number of clients to be reached or the security to be put in place. Then, the virtual network server initiates a routing algorithm, of the OSPF type for example, over the signalling network, which takes account of the status of the physical links of the physical network. It deduces therefrom the physical routers on which to install the virtual routers. Finally, still based on the information given by the user on the service to be implemented, the virtual network server deduces therefrom the necessary resources for each virtual router.

The virtual network server 202 then a carries out step 306 of defining the templates: in accordance with the data relating to the choices made, the virtual network server generates four templates:

- a first template T1 describing the card where the different virtual devices will be installed in order to provide the virtual network: the name of the physical nodes for installation, and the virtual routers,
- a second, physical, template T2, describing the hardware that must be allocated to the virtual router: CPU (Central Processor Unit), memories, network interfaces and their MAC addresses, the bridges and the drivers necessary for connecting the virtual router over the physical links,
- a third template T3 determining the virtual network which will be installed with the different virtual devices: name of the virtual network, type of node, which in the present example is a router, configuration of the necessary resources for operation of the virtual network and definition of the necessary IP addresses, VPN or SSH tunnels to be implemented, etc., and
- a fourth template T4 for the network operating system: the type of NOS, the name that will be used for the operating system, etc.

The virtual network server 202 uses the four previous templates for installing the virtual network. The first template T1 determines the nodes of the network in which a virtual device will be installed. This defines the destinations of the requests which will be transmitted by the server in order to implement the virtual network.

The other three templates T2-T4 fully determine the virtual devices to be installed in the network.

The virtual network server 202 then carries out a step 308 of sending a request via the signalling network 212 to the hypervisors of the different physical nodes involved in installing the virtual network associated with the specific application. This request orders a particular virtual router to be set up, defined by the last three templates T2-T4 described above.

A step 310 of configuring the virtual router is carried out at each of the physical nodes having received a request from the virtual network server 202. As unconfigured virtual router instances are available in each physical node 204-210 of the infrastructure network 200, it is merely necessary for the request for installation of the virtual router to be accompanied by the protocol stack associated with the chosen application that is located in the holding tank 2020 of protocol stacks on the virtual network server 202.

The transfer cost is almost zero as a typical configuration requires at most a few kilobytes of data. These data can be compressed if necessary in order to reduce the size even further.

When the configuration of each virtual router has been set up, the specific virtual network is then operational for serving the client(s) for the specified function(s). The installation time for this network is negligible and occupies a few hundreds of milliseconds or a few seconds.

Figure 4:
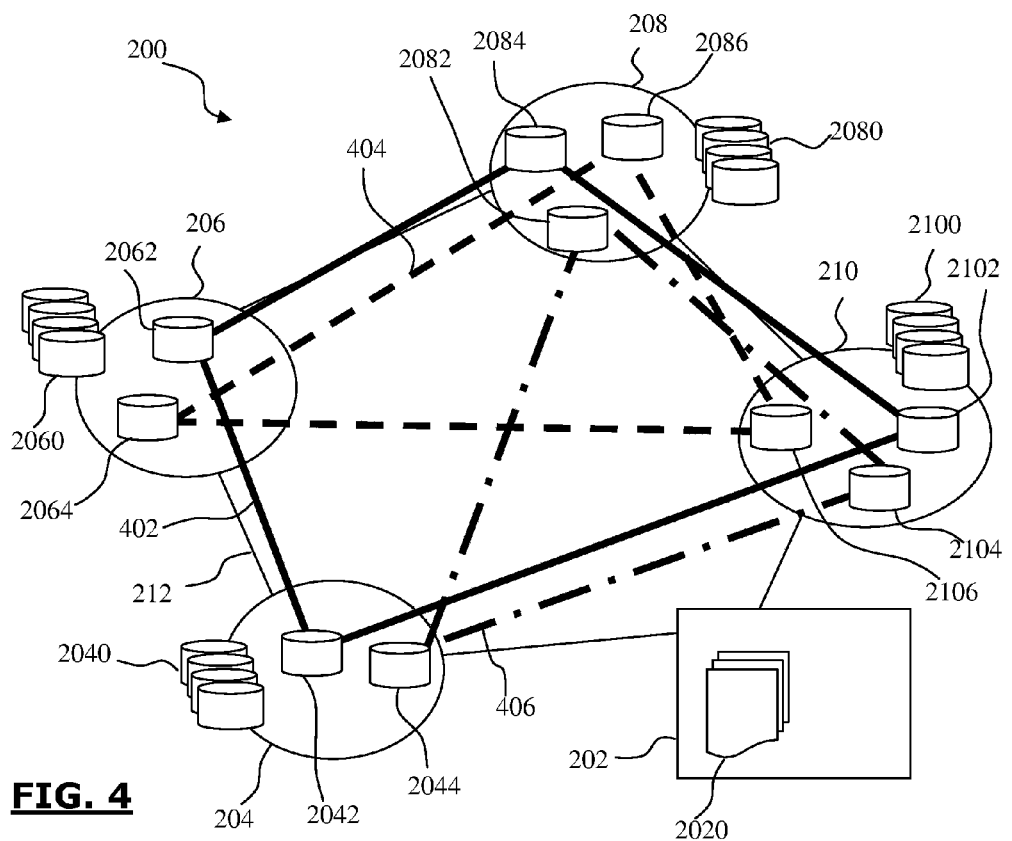
FIG. 4 is a diagrammatic representation of the infrastructure network in FIG. 2 on which three virtual networks have been created in accordance with the method in FIG. 3.

In the example shown, with reference to FIG. 4, three virtual networks have been created on the infrastructure network 200 in FIG. 2. Two virtual routers 2042 and 2044 are installed in the physical node 204, two virtual routers 2062 and 2064 are installed in the physical node 206, three virtual routers 2082, 2084 and 2086 are installed in the physical node 208 and three virtual routers 2102, 2104 and 2106 are installed in the physical node 210. No virtual router is installed on the physical node 202.

By means of virtualization, the network of physical nodes composed of nodes 202 to 210 allows three virtual networks to be installed: 402, 404 and 406, each virtual network being adapted to a specific service.

The three virtual networks 402, 404 and 406 required the creation of:
- two virtual routers on the physical node 204,
- two virtual routers on the physical node 206,
- three virtual routers on the physical node 208, and
- three virtual routers on the physical node 210.

Each of the virtual networks 402 to 406 is isolated with respect to the other virtual networks. Moreover, the thus-created virtual networks can be connected to an existing network, whether physical or not.

The virtual network server 202 is a conventional computer server on which a database contains all the router software instances necessary to meet all the services that the network infrastructure operator can provide. The server 202 is equipped with an operating system that can be of a totally standard type and must be capable of running the algorithms necessary for determining all the data that will allow the above-described four templates to be filled in.

The method described previously allows a virtual network to be deployed on the fly with the properties necessary for providing an application with its parameters, as the deployed protocol can be adapted.

Isolation of the virtual networks from each other makes it possible to consider the networks sealed from each other, and that whatever passes over the other virtual networks does not affect the network in question.

In particular, when a virtual network is connected to an enterprise network, the virtual network is considered to be an extension of the enterprise network with the same security and the same features as the enterprise network. In particular, extension of the network is managed and controlled in exactly the same manner as the nodes of the enterprise network. Once the protocol layers corresponding to the virtual network have been deployed, the user terminal makes it possible to ensure the required properties for carrying out communication on the network deployed on the fly.

The invention therefore allows the installation of a network that can be deployed automatically or on the fly, allowing the data to be transferred with ad hoc properties, instantaneously, in order to perform a communication adapted to the provision of a particular service. For example, a user wishing to communicate with his bank from his portable type computer terminal, smartphone or PDA, in a location where there is connectivity, is able to set up a specific network on the fly allowing him to perform a banking communication with a remote system in complete safety by means of a protocol stack specific to the network and adapted to the necessary characteristics for the communication (security, quality of service, associated resources, etc.). Following the request by the user, the virtual network server installs the network (communication software, network operating system, specific protocol layer) adapted to his request. This virtual network and its protocols can for example be those advised by the bank.

Another example corresponds to a user wishing to carry out a very high-quality, secure telephone communication. For this purpose, he issues a request to deploy a virtual network adapted to this function. The virtual network server instantaneously installs a specific network with resources adapted to ToIP (Telephony over IP) packet transfer.

A third example is an enterprise holding a seminar in a hotel and wishing to extend its enterprise network into the hotel, which by using the invention can instantly install this extension in such a way that the elements of this network can be managed and controlled by the systems engineers of the enterprise.

Finally, a last example is that of an audiovisual operator wishing to install a network instantly in order to broadcast a football match to all users wishing to receive this broadcast live.

In other words, the invention makes it possible to open, on the fly and on demand, any set of networks having standard or proprietary protocol stacks and adapted to the specific applications required by users, independently of each other but sharing the same physical infrastructure.

Of course, the invention is not limited to the examples that have just been described. The virtual network server can be decentralized. The virtual nodes are not only virtual routers and can be all known node types, namely, a gateway, firewall, etc.

The invention claimed is:

1. A method for generating, on the fly and on demand, a virtual communication network adapted to a particular service, the method comprising:
   receiving, at a server, a request to install the virtual communication network adapted to the particular service between a first system and a second system, the first system being remote from the second system, and the particular service being one of a plurality of available services, each of the available services being associated with one of a plurality protocol stacks, wherein each protocol stack of the plurality protocol stacks is adapted to at least one of a security characteristic, a quality of service characteristic, or an associated resources characteristic of the available service associated with the protocol stack; and
   in response to the server receiving the request to install the virtual communication network adapted to the particular service, automatically:
      determining, at the server, data relating to the virtual communication network to be generated in accordance with the particular service;
      transmitting, in accordance with the data, a virtual node request from the server to one or more physical nodes of a physical network, wherein each of the one or more physical nodes includes hardware; and
      for each of the one or more physical nodes, in response to receiving the virtual node request, creating a virtual node on the physical node by generating a network operating system instance with a hypervisor on the physical node, the network operating system instance being associated with the protocol stack associated with the particular service,
   wherein the virtual communication network adapted to the particular service comprises the virtual node of each of the one or more physical nodes and enables the first system to communicate with the second system through the virtual node of each of the one or more physical nodes in accordance with the particular service.

2. The method of claim 1, further comprising configuring each virtual node in accordance with the request for creating a virtual node.

3. The method of claim 1, wherein the transmission of the virtual node request from the server to the one or more physical nodes is carried out via a signalling network according to a predetermined protocol.

4. The method of claim 1, further comprising transmitting virtual device software from at least one computer device to each of the one or more physical nodes of the physical network.

5. The method of claim 1, further comprising transmitting configuration data for a virtual computer device from the server to each of the one or more physical nodes.

6. The method of claim 1, wherein the data relating to the virtual network to be generated comprise data relating to a first template describing the physical nodes where the virtual nodes are to be created.

7. The method according to claim 6, wherein the data relating to the first template comprise the name of the physical nodes on which the virtual nodes are to be created.

8. The method of claim 1, wherein the virtual node request transmitted from the server to the one or more physical nodes comprises data relating to a second template describing one or more physical resources that must be allocated to the virtual node to be created on each of the one or more physical nodes.

9. The method according to claim 8, wherein the data relating to the second template comprise, for each virtual node to be created on each of the one or more physical nodes, data relating to at least one of:
- a central processor unit,
- storage means,
- at least one network interface,
- at least one MAC address, or
- at least one driver and/or bridge necessary for connecting the virtual node to at least one physical link.

10. The method of claim 1, wherein the virtual node request transmitted from the server to the one or more physical nodes comprises data relating to a third template describing the virtual communication network to be generated.

11. The method according to claim 10, wherein the data relating to the third template comprise, for each virtual node to be created on each of the one or more physical nodes, data relating to at least one of:
- the name of the virtual network,
- a type of node,
- an Internet Protocol address, or
- establishing a VPN tunnel, an SSH tunnel, or any tunnel necessary for the communication.

12. The method of claim 1, wherein the virtual node request transmitted from the server to the one or more physical nodes comprises data relating to a fourth template describing the network operating system for the virtual node to be created on each of the one or more physical nodes.

13. The method according to claim 12, wherein the data relating to the fourth template comprise, for each virtual node to be created on each of the one or more physical nodes, data relating to at least one of:
- a type of network operating system, or
- a name of the network operating system.

14. The method of claim 1, wherein at least one of the one or more physical nodes is a router.

15. A system for generating, on the fly and on demand, a virtual communication network, the system comprising:
- a physical network including one or more physical nodes, each of the one or more physical nodes including hardware and a hypervisor; and
- a physical computer device comprising a server, the server being configured to:
  - receive a request to install the virtual communication network, said virtual communication network being adapted to a particular service between a first system and a second system, the first system being remote from the second system, and the particular service being one of a plurality of available services, each of the available services being associated with one of a plurality protocol stacks, wherein each protocol stack of the plurality protocol stacks is adapted to at least one of a security characteristic, a quality of service characteristic, or an associated resources characteristic of the available service associated with the protocol stack; and
  - in response to the server receiving the request to install the virtual communication network adapted to the particular service, automatically:
    - determine data relating to said virtual communication network to be generated in accordance with said selected particular service; and
    - transmit, in accordance with said data, a virtual node request to the one or more physical nodes,
  - wherein said virtual node request is configured to cause a virtual node to be created on each of said one or more physical nodes by causing the hypervisor of each of the one or more physical nodes to generate a network operating system instance associated with the protocol stack associated with the particular service, and
  - wherein said virtual communication network adapted to the particular service comprises the virtual node of each of the one or more physical nodes and enables the first system to communicate with the second system through the virtual node of each of the one or more physical nodes in accordance with the particular service.

16. The system according to claim 15, wherein each of the one or more physical nodes includes a virtual machine configured to launch a virtual network device on said physical node, wherein the virtual node of each of the one or more physical nodes includes the virtual device launched on the physical node.

17. The system of claim 15, wherein each virtual node is chosen from the following virtual computer devices:
- a virtual router,
- a virtual switch,
- a switch router or label-switched router,
- a firewall, and
- a virtual box.

* * * * *

UNITED STATES PATENT AND TRADEMARK OFFICE
CERTIFICATE OF CORRECTION

| | | |
|---|---|---|
| PATENT NO. | : 9,137,105 B2 | Page 1 of 1 |
| APPLICATION NO. | : 13/382541 | |
| DATED | : September 15, 2015 | |
| INVENTOR(S) | : Guy Pujolle et al. | |

It is certified that error appears in the above-identified patent and that said Letters Patent is hereby corrected as shown below:

In the Specification:
Column 3,
Line 5 reads "central processor unit." and should read -- central processor unit, --.

Column 4,
Line 53 reads "so that that" and should read -- so that --.

Column 4,
Line 60 reads "accordance with of one or more" and should read -- accordance with one or more --.

Column 5,
Line 7 reads "with their net work" and should read -- with their network --.

Column 5,
Line 52 reads "server 202 then a carries out step 306" and should read -- server 202 then carries out step 306 --.

In the Claims:
Column 8, Claim 1
Lines 11-12 reads "with one of a plurality protocol stacks, wherein each protocol stack of the plurality protocol stacks is adapted" and should read -- with one of a plurality of protocol stacks, wherein each protocol stack of the plurality of protocol stacks is adapted --.

Column 10, Claim 15
Lines 6-7 reads "plurality protocol stacks, wherein each protocol stack of the plurality protocol stacks is adapted to at least" and should read -- plurality of protocol stacks, wherein each protocol stack of the plurality of protocol stacks is adapted to at least --.

Signed and Sealed this
Seventh Day of June, 2016

Michelle K. Lee
*Director of the United States Patent and Trademark Office*